Figure 1:
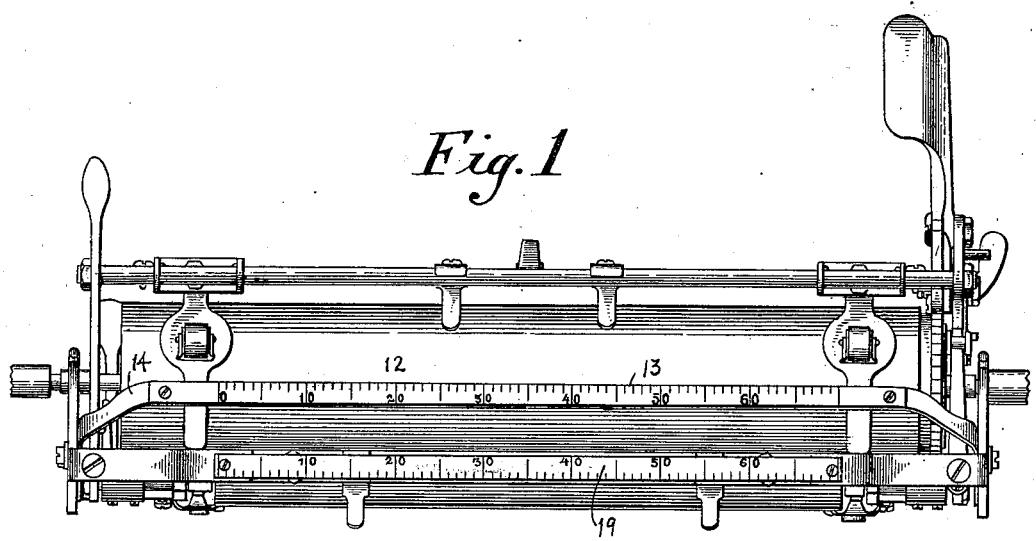

No. 658,156. Patented Sept. 18, 1900.
H. W. MERRITT.
TYPE WRITING MACHINE.
(Application filed Oct. 22, 1897.)

(No Model.) 3 Sheets—Sheet 1.

WITNESSES:
Fr. N. Roehrich
M. W. Pool

INVENTOR
Henry W. Merritt
BY
Jacob Felbel
ATTORNEY

No. 658,156. Patented Sept. 18, 1900.
H. W. MERRITT.
TYPE WRITING MACHINE.
(Application filed Oct. 22, 1897.)
(No Model.) 3 Sheets—Sheet 2.
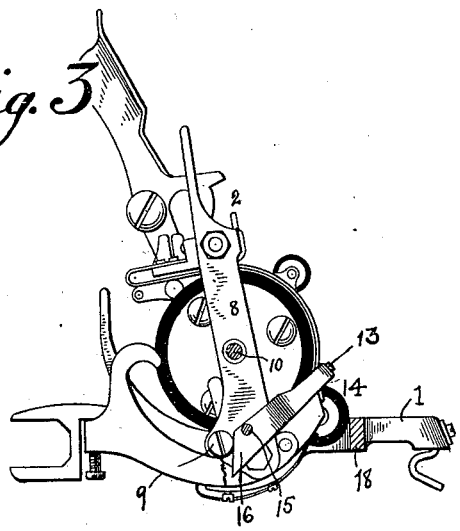
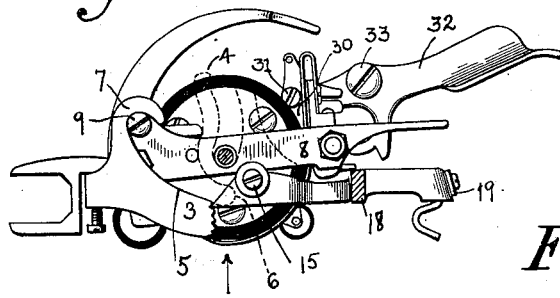
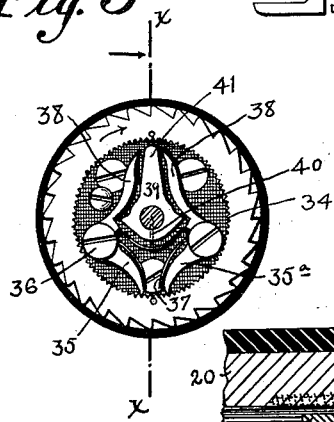
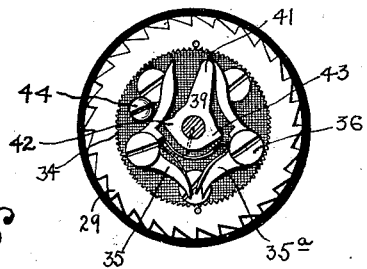
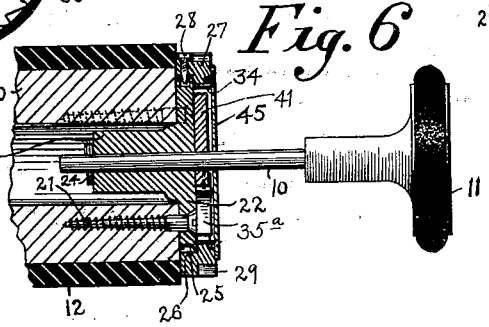
WITNESSES:
Fr. N. Roehrich
M. W. Pool
INVENTOR
Henry W. Merritt
BY Jacob Felbel
ATTORNEY

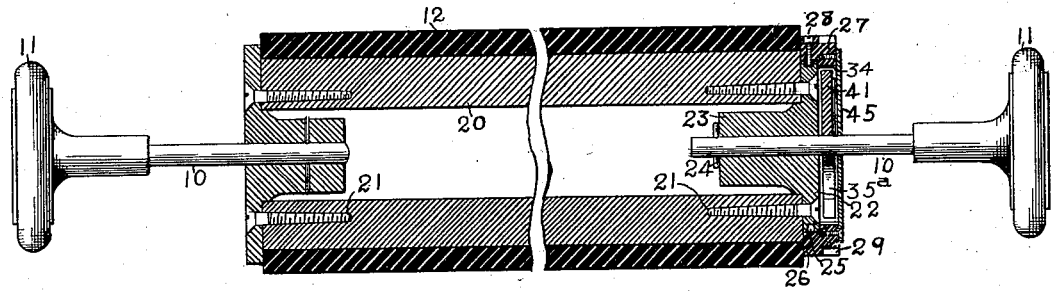
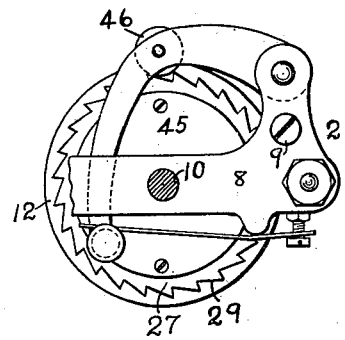
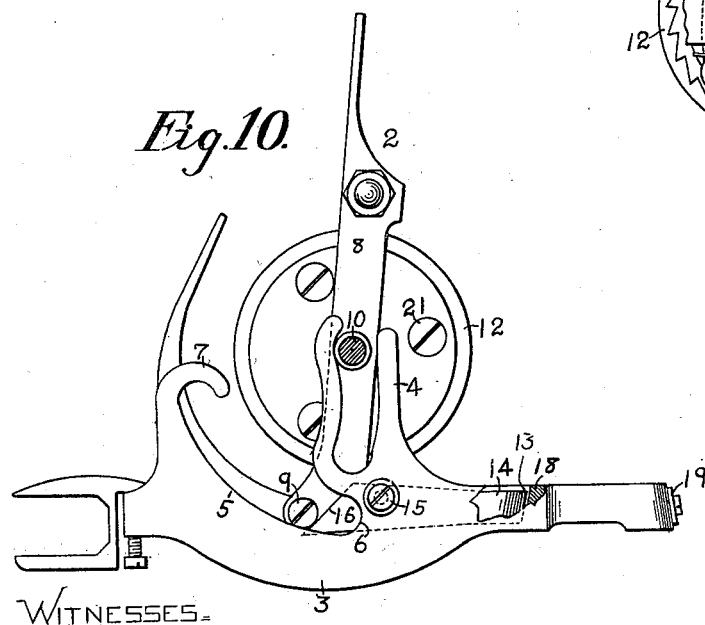

UNITED STATES PATENT OFFICE.

HENRY W. MERRITT, OF SPRINGFIELD, MASSACHUSETTS, ASSIGNOR TO THE DENSMORE TYPEWRITER COMPANY, OF SYRACUSE, NEW YORK.

TYPE-WRITING MACHINE.

SPECIFICATION forming part of Letters Patent No. 658,156, dated September 18, 1900.

Application filed October 22, 1897. Serial No. 656,044. (No model.)

*To all whom it may concern:*

Be it known that I, HENRY W. MERRITT, a citizen of the United States, and a resident of Springfield, in the county of Hampden and State of Massachusetts, have invented certain new and useful Improvements in Type-Writing Machines, of which the following is a specification.

My invention relates, first, to the platen-scale by which the paper is squared on the platen and adjusted properly with reference to the printing-point, and, secondly, to means for releasing the platen from the line-spacing mechanism, so that it may be independently turned either backward or forward for any desired distance. The platen-scale should be arranged at or come as close as possible to the printing-point; but it is impracticable to fixedly place the platen-scale in alinement with the printing-point, for the reason that the types would strike said scale in the printing operations. Therefore it has been the custom heretofore to so attach the scale that its graduated edge shall always stand back of the printing-point the distance of one or two type-spaces, according as the machine is of the non-shifting or shifting platen class. On this account it has been necessary heretofore first to adjust the line of print or that portion of the paper which is to be printed upon or corrected to a false position relatively to the printing-point or to a position one or two spaces back of the printing-point, and then subsequently to rectify this adjustment by a rotative movement of the platen one or two notches or spaces, so as to bring the portion to be printed upon into register with the printing-point of the platen when it is down in working position, if the machine be of the swinging or turn-up platen-carrier description, and the types strike on the under side of the platen, as in the Densmore machine. This mode of inserting and adjusting the paper when the platen is in its non-working position is not only troublesome and inconvenient, but it conduces to errors on the part of the operator, since it frequently happens that after the paper has been properly adjusted to the so-called "false" position the operator forgets or omits to advance the paper to the proper printing position before turning down the platen or afterward, and hence the printing is procedeed with on a line or at a portion of the sheet not desired, and in consequence the work is often spoiled.

The main object of my invention is to overcome these objections; and to this end it consists, primarily, in a machine of the hinged or swinging platen-carrier type, in the use of a movable platen-scale so mounted that it shall automatically move to the printing-point of the platen when the platen is turned to a non-working position and shall automatically recede from the printing-point as the platen is turned back to its working position, so as to be at the proper position for adjustment of the paper in the one case and back out of the way of the types in the other case, as will hereinafter more fully appear; but one part of my invention may be carried out in other styles of machines, as where the types strike upon the top or front of the platen and in which there is no turning movement of the platen from a working to a non-working position and back again. In this class of machines it is just as essential that the platen-scale should be arranged as near as possible to the printing point or line of print as in the understrike-machines; but for the reasons hereinbefore explained it is impossible to mount the platen-scale fixedly in register with the printing-line on account of the liability of the types to strike the scale, and in this class of machines likewise it has been necessary heretofore first to adjust the paper to a false position and then to move the paper and platen one or two line-space distances, so as to bring the line or portion of the paper to be printed upon to the printing-line or to the plane in which the type impressions are made. The main object of my invention is to avoid this complicated and confusing mode of adjusting the paper falsely and subsequently righting it.

My invention therefore further consists in combining with the platen a platen-scale which is so connected and arranged as that normally it is supported away from the printing-point or printing-line, so as not to interfere with the printing, but which is adapted to be moved from this normal position to a position in register with the printing point or line and to be supported in such working position, thereby avoiding the objections which exist to the use of the stationary or fixed platen-scale.

Line-spacing mechanisms are usually constructed to rotate the platen by means of a pawl and ratchet-wheel step by step through fixed distances, and by reason of this fact it is impracticable or at least exceedingly difficult to write upon the lines of ruled paper when the lines are arranged at distances apart different from the spacing distances afforded by the pawl and ratchet mechanism. One of the objects of the second part of my invention is to provide a construction whereby the writing may be conveniently done upon ruled paper and may also be conveniently done upon partially-printed blanks or forms where there are spaces to be filled in by the type-writer. This object of my invention is accomplished by providing means for releasing the platen itself from the line-spacing devices, so that the platen may be turned freely independently thereof either backward or forward and for any desired distance, so as to facilitate the bringing of ruled lines or blank spaces to the printing-point, and in this respect my invention consists in the features of construction and combinations of devices hereinafter more fully described, and particularly pointed out in the appended claims.

Heretofore it has been the practice to drag the paper around the platen by hand to adjust any desired point thereon to the platen-scale, and thereupon to advance the platen one or two-line space notches to bring the desired point or line upon the paper into register with the printing-line. I provide a construction whereby any point or line upon the paper may be adjusted directly to the printing-line upon the platen by a single rotatory movement of the platen in either direction.

Figure 2:
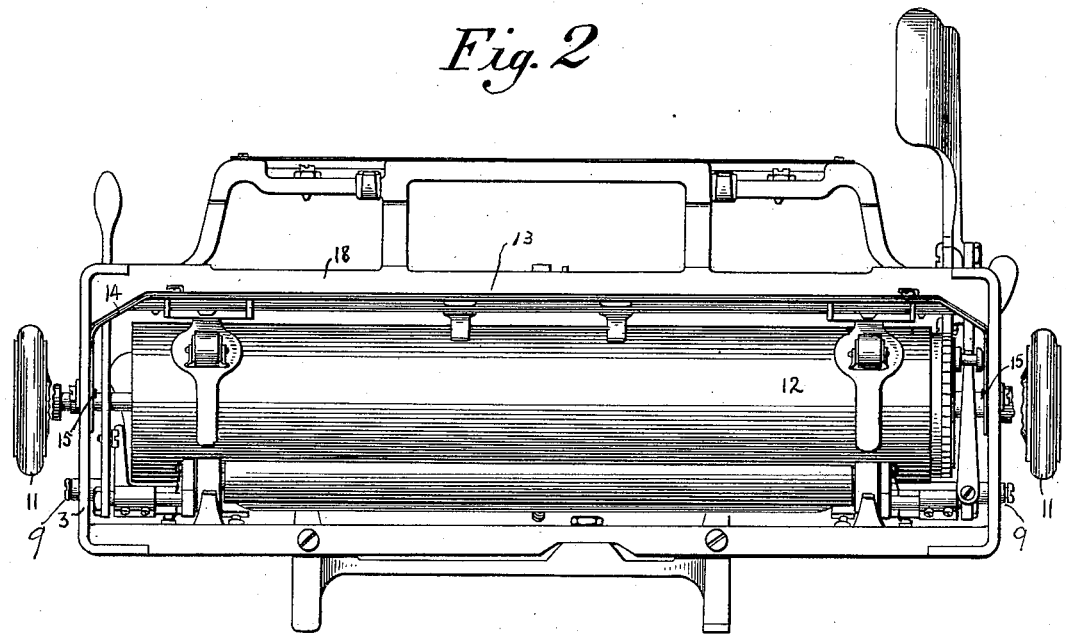

In the accompanying drawings, Figure 1 is a front elevation of a portion of a Densmore writing-machine embodying my several improvements, the platen carrier or frame being shown as turned to an upright or non-working position and the platen-scale as having been moved to the printing-point to facilitate the squaring and adjustment of the paper. Fig. 2 is a bottom plan view or an elevation looking in the direction of the arrow at Fig. 4 and with the platen-frame in its down or normal working position. Fig. 3 is a left-hand elevation, partly in section, of the carriages with the platen carriage or frame turned up to the non-working position shown at Fig. 1. Fig. 4 is a similar elevation, partly in section, with the platen-carrier down in its normal or working position. Fig. 5 is a view of the right-hand end of the platen with its cap-plate removed. Fig. 6 is a vertical section taken at the line $xx$ of Fig. 5, but showing the actuating and releasing devices in different positions. Fig. 7 is a view of the right-hand end of the platen with its cap-plate removed and showing the actuating and releasing devices in positions different from those shown in Fig. 5. Fig. 8 is a longitudinal sectional view of the platen, showing a hand-wheel at the left rigidly secured or connected to the platen for adjusting the latter through regular intervals and also a hand-wheel at the right for adjusting the platen through irregular or minute intervals. Fig. 9 is a side elevation of a portion of the right-hand end of the platen-frame, showing the relation between the platen-positioning wheel and the spring-check or holdfast-dog which coöperates therewith to position the platen after free rotation of the latter in either direction. Fig. 10 is a view similar to Fig. 3, but showing the entire left-hand end bar of the carriage and also showing the platen-frame as swung or moved forwardly a little from the Fig. 3 position.

In the several views the same part will be found designated by the same numeral of reference.

1 designates the main carriage of a Densmore machine, and 2 the platen carriage or frame rotatably mounted therein in the usual way. Each end bar 3 of the main carriage is provided with a vertically-arranged fork or upright slotted member 4 and with a curved guiding portion or edge 5, which terminates at one end beneath the forked portion in a recess or stop 6 and at the other end in a hook-like stop device 7. Each end bar 8 of the platen carrier or frame is provided with a lateral stud 9, which is adapted to travel along said curved edge 5 from one stop to the other during the rotative movements of the platen-frame. The platen-axle 10 is supported in the end bars 8 of the platen-frame, and the ends of said axle project through the slots in the forked members 4 at each end of the main carriage and travel up and down in said slots during the rotative or turning up and down movements of the platen-frame, the said platen-axle resting at the bottoms of said slots and the said stud 9 bearing against the said hooks 7 when the platen-frame is down in working position. The platen axle or shaft may be divided or consist of two separate parts, and the outer ends thereof may be provided with a hand-wheel or knob 11 to facilitate the rotation of the cylindrical platen or roller 12, as will appear hereinafter.

13 designates the platen-scale, which is connected to or provided with arms 14, which are extended or bent parallel with the end bars 3 of the main carriage and are pivoted thereto, as at 15. The extremities of said arms extend beyond the pivots and are beveled to form cams, as shown at 16, and are acted upon in the proper manner by the lateral studs 9, arranged one on the outer side of each bar 8 of the platen-frame, while the platen-frame is completing its rearward movement from the Fig. 10 to the Fig. 3 position. The scale portion proper of the device, as shown at Figs. 2 and 4, stands normally behind and parallel with the front bar 18 of the main carriage, at which time it will be understood the platen-frame and the platen are down in their normal working positions. When, however, the platen-frame and platen are turned up to the non-working position for inspection or correction of the work or for the insertion and adjustment of the paper, as shown at Figs. 1 and 3, said scale-bar is vibrated upwardly and brought to the printing-point on the platen. This is accomplished automatically by the studs or projections 9 on the platen-frame striking against the beveled edges of the scale-bar arms, thus causing the outer ends of said arms, Fig. 10, to rise and carry the scale upwardly to the printing-point, Fig. 3, where the scale is then held by the pressure of the platen-frame. In this position of the scale the paper may be squared with reference to the platen and the line to be written upon adjusted with reference to the scale, which extends longitudinally of the platen parallel with its axes. After this manipulation of the paper it is necessary only to turn down the platen-frame and platen to working position and the previously-adjusted portion of the paper is brought at once to the proper position to receive the impact of the types and without special line-spacing or rotative movements of the platen, as heretofore. In the slight forward movement of the platen-frame from the Fig. 3 to the Fig. 10 position the cams release the scale-arms and the scale drops by gravity to its normal position, which is remote from the printing-point of the types. The cam portions 16 of the scale-arms are so close to the pivot 15 and so shaped as to permit a prompt retraction of the scale 13 from the printing-line by the action of gravity, or, in other words, a slight forward movement of the platen-frame from the position shown at Fig. 3 will cause a movement of the scale from the position shown at Fig. 3 to that shown at Fig. 10, so that while the line being written or the printing-line is still in front of the platen, and hence in view of the operator and accessible for erasing errors, the scale is moved downwardly away from the said printing-line. Hence erasures may be freely made without contact of the erasing-rubber with the scale. The latter is likely to be soiled from the ribbon or otherwise, and if the rubber should touch the scale it would be liable to transfer ink from the scale to the paper. If a knife should be used the edge thereof would be dulled by contact with the metallic scale. When the platen is swung up to the position at Figs. 1 and 3, the paper is inserted and the line or portion to be printed on is brought into register with the scale, and then the platen-frame is lowered and the writing begun, the type impressions falling upon the line with which the scale registers at said figures. When making corrections, the paper is inserted and adjusted in the same way, and then the platen-frame is moved forwardly a little until the scale 13 moves downwardly from the printing-line to substantially the position shown at Fig. 10, so that while the platen-frame is in substantially an upright position and while the writing is therefore in full view and the printing-line accessible the scale is far enough away from the printing-line to permit erasures to be made conveniently. If desired, the platen-frame may then be moved rearwardly again to permit comparison of the printing-line with the scale to make sure that the paper has not been moved by the erasing-rubber, and then the platen may be moved downwardly and the type-keys operated. Inasmuch as a slight forward motion of the platen-frame from the position shown at Fig. 3 is sufficient to move the scale down to its normal position, it is apparent that no further movement of the scale occurs or needs to occur during the completion of the forward or downward movements of the platen. The greater part of the turning-up movement of the platen-frame occurs without independent movement of the scale 13; but in the last portion of the platen movement or when said platen is moving rearwardly substantially in a horizontal line the cam ends of the arms 16 are operated upon by the lateral projections 9 upon the lever 8, and the scale is quickly moved into register with the printing-line. Viewed in one way, therefore, the movement of the platen-frame may be divided into two portions, one portion consisting in a movement upwardly from working position to exhibit the line of writing and the other portion consisting in a subsequent rearward movement to effect a movement of the scale into register with the line of writing. It will therefore be observed that one portion of my invention consists in combining with a platen and a platen-frame, so constructed and arranged as to exhibit the printing-line in front of the platen, a scale which is movable in front of the platen upwardly into register with the printing-line and downwardly away therefrom while the printing-line is exposed to view, and while I prefer to obtain this scale movement by a movement of the platen-frame (which acts as a lever upon the scale-frame) still this feature of construction is not essential in all forms of my invention, as the movements of the platen-scale may be otherwise secured, and although I prefer an automatic movement of the scale, especially in under strike-machines, still such automatic feature may be omitted, if not desired. As far as this and other features of my invention are concerned, numerous changes in detail construction and arrangement of the scale and of its operating devices and other parts may be made without departing from the gist of the improvements. One portion of the invention may be said to consist, broadly, in a scale which moves automatically to the printing-point when the platen is turned to a non-working position and which moves automatically away therefrom when the platen is turned to a working position for the purposes set forth. The main carriage has the usual scale 19, adapted to a stationary pointer. (Not shown.)

I shall now describe the means for releasing the platen from its line-spacing mechanism, so that it may be moved independently thereof and without disturbance of said mechanism.

The platen, as usual, may consist of a hollow wooden core 20, surrounded by a rubber sheath. To one end of this platen is secured, by means of screws 21, a circular plate 22, preferably provided centrally with a hub 23, which enters the core of the platen and supports the right-hand platen shaft or axle 10 or a portion thereof and which may be secured thereto against outward movement by means of a pin 24. The said plate or disk 22 is formed with a groove 25 entirely around its periphery, and projecting into this groove from a flange or collar 26 on the inner side of a ratchet-wheel 27 are several screws 28, by which means the ratchet-wheel is loosely supported on the disk. The ratchet-wheel is provided around its outer edge with the usual series of teeth 29 to be engaged by the line-spacing pawl 30, pivoted at 31 on the line-spacing lever 32, which is pivoted to the right-hand end of the platen-frame at 33 in identically the manner of the line-spacing mechanism of the Densmore machine. The ratchet-wheel is made in the form of a ring or annulus, and the inner periphery thereof is formed or provided with a multitude of very fine teeth or corrugations 34, with which engage normally the points of two dogs 35 and 35ª, pivoted at 36 upon the disk or circular plate 22. A spring 37 is provided to keep each dog in engagement with the teeth 34 of the ring; but these springs are preferably formed integral or of a single piece of metal, as shown. Each said dog is provided with an extension or arm 38 on the opposite side of its pivot, and the arms 38 of the two dogs are bent or shaped so as to extend toward each other, as are also the dogs themselves. The dogs and arms form or constitute small levers, and these are adapted to be acted upon practically simultaneously by an oscillator 39, fixed by a screw or pin 40 upon the shaft or axle 10. This oscillator is provided with an arm or portion 41, which is adapted to act upon the extremities of both of the arms 38, and with two arms or projections 42 and 43 on opposite sides of the center, to also act on said arms 38, but nearer their pivots. At Fig. 5 the parts are shown in their normal positions, with the dogs in engagement with the fine teeth of the ratchet-wheel or ring and with the oscillator in a central vertical position between the arms of said dogs, and in these positions of the parts the platen proper is connected operatively with the line-spacing mechanism. If now the line-spacing lever be actuated, its pawl will operate the ratchet-wheel 27, and this will turn the disk or plate 22 through the medium of the fine teeth 34, and the dogs and the said disk or plate being attached directly to the platen the latter will turn in unison therewith, the shaft 10 and the oscillator 39 also turning with these devices, but without changing the position of the latter relatively to the dog-arms. If it should now be desired to turn the platen independently of the ratchet-wheel or line-spacing mechanism, the knob or hand-wheel 11 may be turned in either direction, and at the initial rotation of the shaft 10 the oscillator secured thereto will turn so as to bring the arms or projections thereon into engagement with the arms on the dogs, separate them, and thus lift the dogs themselves out of engagement with the ratchet-teeth 34 of the ratchet-wheel. When this disengagement has been effected, the shaft may be turned farther in the same direction, and the platen will be caused to turn with said shaft, while the ratchet-wheel will remain stationary. In the disengaging action of the dogs by the oscillator the motion is preferably limited by a stop 44 in the form of a screw. At Fig. 7 the dogs are shown as disengaged from the interior teeth of the ratchet-wheel, and this is effected, it will be observed, by the arm 41 pressing against the right-hand arm 38 and the projection 42 pressing against the other arm 38, thereby spreading these arms outwardly or from each other and causing the dogs to swing inwardly and toward each other against the tension of their springs, which of course operate to restore these parts to normal positions when the rotative force at the hand-wheel or shaft is released. The shaft is here shown as having been turned in a right-hand direction; but if it should be turned in the opposite direction the arm 41 would bear against the left-hand arm 38 and the projection 43 would bear against the right-hand arm 38, thus producing a similar effect upon the dogs.

It will be understood, of course, that while the dogs are out of engagement with the ratchet-wheel the platen may be turned through either minute or large arcs or distances regardless of the line-spacing mechanism and without special disengagement or disturbance thereof, and hence that a ruled line or a blank space to be brought to the printing-point may be very easily and quickly adjusted thereto. During the regular line-spacing actions through the distances of the coarse or wide spaced outside teeth of the ratchet-wheel and by means of the line-spacing lever 32 the platen turns in the direction of the curved arrow at Fig. 5 and is driven with said ratchet-wheel by the engagement with the inside teeth 34 of said wheel of the dog 35 and by its plate or support attached to the platen, the dog being prevented from turning independently at this time by reason of its oblique arrangement, due to the location of its pivot relatively to the teeth of the wheel; but this arrangement of the dog 35 will not prevent the ratchet-wheel from turning in the opposite direction, for in such movement the point of the dog could bob freely over the interior teeth 34 of the ratchet-wheel. In the entire construction exhibited, however, this cannot take place, because of the presence of the supplemental dog 35$^a$, which is adapted to work rigidly with the ratchet-wheel on any reversal or backward rotation thereof, and thus the platen will always be rotated when the ratchet-wheel is rotated, whether the direction be forward or backward. It will thus be seen that the dogs are oppositely acting and normally prevent rotation of the platen in either direction relatively to the line-feed ratchet-wheel 27. If it be desired to connect the platen to the ratchet-wheel so that the platen shall turn therewith only in one direction—namely, that in which the ratchet-wheel is turned for regular line-spacing purposes—the dog 35$^a$ may be omitted, and for this reason I do not wish to be confined, unless expressly set forth in the claims, to the use of both dogs. I prefer to employ both said dogs and to connect the rod or shaft at the opposite end of the platen rigidly to the left-hand end of the platen in a well-known manner, so that when the hand-wheel or knob at this end is turned in either direction the platen may be rotated step by step the regular line-spacing distances as defined by the outer teeth of the ratchet-wheel, and in order that this may be accomplished it is necessary to employ both of said dogs. When the said opposite or left-hand knob is turned and the platen is directly turned thereby, the plate 22 will communicate the motion to the ratchet-wheel in the same direction by the engagement of one or the other of the dogs with the interior ratchet-teeth, according to the direction in which the platen is turned.

From the construction shown and described it will be seen that when the line-spacing lever is used the ratchet-wheel and platen are turned together regular line-space distances, that when the right-hand wheel or knob 11 is turned in either direction the platen is turned therewith any desired distance, but the ratchet-wheel remains at rest, and that when the left-hand wheel or finger-piece is turned in either direction the platen and the ratchet-wheel turn together regular line-space distances, owing to the fact that the left-hand wheel or finger-piece is connected rigidly with the platen and always turns therewith. A covering-plate 45, screwed onto the outside of the ratchet-wheel, may be provided, if desired, so as to inclose and protect the pawl-and-ratchet mechanism within said wheel or ring. When the ratchet-wheel is disengaged from the platen and the platen is rotated independently thereof, the said wheel is held stationary by the usual holdfast dog or roller.

The means for releasing the platen from the line-spacing mechanism and for rotating it independently thereof may be employed advantageously for making corrections in ordinary type-written matter where the line to be corrected must be brought around to the printing-point. For making such corrections it is only necessary to set the paper straight and then by means of the knob feed the paper along until the place of correction is brought to the printing-point, thus avoiding the pulling of the paper by hand over the surface of the platen, as customary heretofore, and also avoiding the necessity of first making an adjustment of the paper to a false position and subsequently rotating the platen through one or two line-space intervals to bring the desired point upon the paper into register with the printing-line, thus avoiding the liability of errors and economizing time in the operation of the machine. It will also be seen that I have contrived a mechanism for adjusting the paper in opposite directions through either regular or irregular intervals at will and that said mechanism comprises a cylindrical platen and means operating automatically to position the platen after rotation thereof in either direction, said positioning means including a wheel, as 27, having a series of positioning teeth or notches, as 29, arranged at line-space intervals, and a series of minute teeth, as 34, provided upon or connected to said wheel. Of course during the operation of the line-feeding mechanism the wheel 27 performs the function of a line-feed wheel; but it will be understood that upon the free rotation of the platen in either direction by the left-hand finger-wheel for the purpose of adjusting the paper thereon through one or more regular or full-line spaces said wheel 27 operates only as a positioning-wheel—that is to say, if the platen when turned should be stopped at a point between two lines of writing the spring-check 46, which is provided upon the Densmore machine, would, by a camming action upon a tooth of said wheel, move the platen automatically a slight distance to bring the paper thereon into exact line-space position. Thus the operator may turn the platen back a few lines, either to correct an error or for any other purpose, by means of the left-hand finger-wheel, which is rigidly connected to the platen, the said wheel 27 thereupon coöperating with the said spring-check to position the platen, so that the desired correction may be made exactly upon the line of writing. Then the operator may rotate the platen forwardly to continue his work, the wheel 27 again coöperating with said spring-check to position the platen. Hence by manipulation of the left-hand finger-wheel the paper may be adjusted in opposite directions through regular line-space intervals and by manipulation of the right-hand finger-wheel the paper may be adjusted in opposite directions through irregular or minute intervals.

The scale 13 must of course move longitudinally with the carriage, and to that end is pivotally mounted upon the frame, which is designated as 1 and which serves as a traveling support for the platen. Said scale is normally supported away from the printing-line of the platen, so as to clear the types, and is movable to a position in register with said printing-line, such movement being preferably of an automatic nature and effected by the offset 9 upon the lever 8 contacting with and vibrating the scale-supporting arms 16 and independently of any movement of the platen-carrying frame 1. Said offset devices 9 also serve to support the scale in register with the printing-line. By the term "printing-line" is meant an imaginary line drawn upon the platen and coinciding with the lower edges of the type impressions or, in other words, the line upon which the type impressions are being made at any given time. It will be understood that during the line-spacing rotation of the platen said printing-line does not rotate therewith, but remains in a given plane. It will be further understood that when the platen is swung up to the position shown at Fig. 3 said imaginary printing-line swings up therewith, so that when the scale 13 is brought into working position it registers with said printing-line. By turning the right-hand finger-wheel 11 in the proper direction any point or line upon the paper may be brought into register with the scale and the type impressions will fall upon the desired line upon the paper. So far as the movement of the scale 13 to and away from the printing-line is concerned it is obviously immaterial whether or not the platen has to be swung or moved downwardly from the position shown at Fig. 10 in order to receive the type impressions, and while I show automatically-operating devices for moving said scale upwardly during the movement of the platen and prefer to use them in connection with the Densmore and other lifting-platen frames, still my movable platen-scale will prove highly useful for the purposes set forth, even if the automatic operation thereof be dispensed with. Any desired line upon the paper may be brought directly into register with the printing-point by a rotation of the right-hand finger-wheel 11 in one direction only, either forwardly or backwardly, as the case may be. This feature is of much importance, particularly in cases where closely-ruled paper is used, as it is possible to bring each ruled line into register with the printing-line upon the platen by successive partial rotations of the said finger-wheel in a single direction. The manipulation of the type-keys may proceed directly after the ruled line is brought into register with the scale and without the necessity, as heretofore, of first bringing the ruled line into register with a fixed platen-scale or, in other words, to a false position and then rotating the platen one or two notches, as the case may be, to bring the ruled line into register with the printing-line. Thus confusion and mistakes are avoided and the work is expedited. In so far as this broad feature of the invention is concerned it is not material what means are used for rotating the platen variably through irregular distances or for holding it in its adjusted positions so long as the platen may be rotated regardless of the platen-positioning wheel 27 to bring any line upon the paper into register with a scale which itself registers with the printing-line upon the platen, so that writing may proceed without further rotative adjustment of the platen-positioning wheel 27 or the platen.

I have carried out my invention relating to the means for releasing and turning the platen in a modified construction of said means, which construction, however, forms the subject-matter of a separate application, filed October 22, 1897, Serial No. 656,045, and it will be understood that some of the claims of this application are intended to cover not only the form of my invention as shown carried out in this case, but also the same as shown carried out in the said companion case.

Various other changes in detail construction and arrangement may be made without departing from the gist of my invention.

What I claim as new, and desire to secure by Letters Patent, is—

1. In a type-writing machine, the combination with a carriage, of a platen adapted to be turned from a working to a non-working position, and a platen-scale which is connected to the carriage so as to move longitudinally therewith and which moves automatically to the printing-line when the platen is turned to a non-working position and which moves automatically away therefrom when the platen is turned to a working position.

2. In a type-writing machine, the combination with a platen adapted to be turned from a working to a non-working position, a carriage, of a platen-scale having arms which are attached to the carriage, and means for acting on said arms to cause said scale to automatically move to the printing-line when the platen is turned to its working position.

3. In a type-writing machine, the combination with a carriage, of a platen adapted to be turned from a working to a non-working position, a platen-frame in which said platen is mounted, a platen-scale attached to said carriage and having arms, and devices on said platen-frame for acting on said arms to move the platen-scale to the printing-line as the platen is turned to a non-working position.

4. In a type-writing machine, the combination with a carriage, of a platen adapted to be turned from a working to a non-working position, a platen-scale having arms at its ends, said arms being pivoted to the carriage, and means for acting on said arms to swing the platen-scale to the printing-line as the platen is turned to a non-working position.

5. In a type-writing machine, the combination of a platen adapted to be turned from a working to a non-working position, a swinging platen-frame in which said platen is mounted, a carriage for supporting said swinging platen-frame, a platen-scale pivoted to said carriage, and projections on said platen-frame for swinging said scale to the printing-point when the platen-frame and platen are turned to a non-working position.

6. In a type-writing machine, a mechanism for adjusting paper through either regular or irregular intervals at will, comprising, in combination, a cylindrical platen, means operating automatically to position the platen after free rotation thereof in either direction and including a wheel having a series of positioning teeth or notches arranged at line-space intervals, a set of minute teeth, a dog normally in engagement with said minute teeth and causing said platen and said positioning-wheel to rotate together, and means for disengaging said dog from said set of minute teeth.

7. In a type-writing machine, a mechanism for adjusting paper in opposite directions through either regular or irregular intervals at will, comprising, in combination, a cylindrical platen, means operating automatically to position the platen after free rotation thereof in either direction and including a wheel having a series of positioning teeth or notches arranged at line-space intervals, a set of minute teeth, means engaging said set of minute teeth and normally causing said platen and said positioning-wheel to rotate together in either direction, and means for releasing said engaging means and simultaneously rotating the platen in either direction independently of said positioning-wheel.

8. In a type-writing machine, the combination of a revoluble platen, a wheel having outside teeth and fine inside teeth, a line-spacing mechanism adapted to the first-mentioned teeth, and a dog connected to the platen and adapted to the second-mentioned teeth.

9. In a type-writing machine, the combination of a revoluble platen, a ratchet-wheel having a circular series of teeth adapted to a line-spacing pawl, and a circular series of fine teeth, a dog connected to the platen and normally in engagement with said fine teeth, and means for breaking such engagement; whereby when the parts are in normal condition the ratchet-wheel and platen turn together, but when the dog is disengaged from the fine teeth the platen may turn independently of the ratchet-wheel.

10. In a type-writing machine, the combination of a revoluble platen, a ratchet-wheel having a set of coarse teeth and a set of fine teeth as described, a line-spacing pawl for engaging the set of coarse teeth, a dog for engaging the set of fine teeth and connected to the platen, a platen-shaft, and an oscillator on said shaft for disengaging said dog from its teeth.

11. In a type-writing machine, the combination of a revoluble platen, a ratchet-wheel having two sets of teeth as described, a pair of oppositely-acting dogs connected to said platen and normally engaging one set of the teeth of said ratchet-wheel, a platen-shaft, and means on said shaft for simultaneously disengaging both said dogs from said ratchet-wheel.

12. In a type-writing machine, the combination of a revoluble platen, a ratchet-wheel having two sets of teeth as described, a pair of oppositely-acting spring-pressed dogs engaging one set of said teeth, arms on said dogs, and an oscillating device controlled by the platen shaft or axle for moving said dogs out of operative relation to the ratchet-wheel.

13. In a type-writing machine, the combination of a revoluble platen, a ratchet-wheel having two sets of teeth as described, a plate attached to said platen, a pair of dogs pivoted on said plate and having arms, springs for holding said dogs normally in engagement with said ratchet-wheel, a platen shaft or axle, and a three-armed oscillator controlled by said shaft or axle for simultaneously disengaging said dogs from the ratchet-wheel.

14. In a type-writing machine, the combination of a revoluble platen, a plate secured thereto and having an inwardly-projecting hub and a peripheral groove, a platen shaft or axle mounted in said plate and hub, a ratchet-wheel having a series of regular line-spacing teeth on its outside and having a flange or collar which is connected to the said plate by means of screws or pins passing therethrough into the peripheral groove of said plate, a set of fine ratchet-teeth also formed interiorly of said ratchet-wheel, a pair of dogs pivoted to said plate and having arms or extensions, springs for holding said dogs normally in engagement with the interior ratchet-teeth, and a three-armed oscillator attached to said platen axle or shaft for disengaging said dogs from their ratchet-teeth.

15. In a type-writing machine, a revoluble platen having at one end a ratchet-wheel adapted to a line-spacing device and connected to the platen through a dog-and-ratchet mechanism so that the platen and the ratchet-wheel turn together when the line-spacing device is operated, a hand-wheel or knob, a device controlled thereby for disengaging said dog from its ratchet so that the said hand-wheel or knob may release the platen from its ratchet-wheel and may turn the platen variable distances without rotating said ratchet-wheel; and another hand-wheel or knob attached to the opposite end of the platen for turning the same and its ratchet-wheel in either direction independently of the line-spacing device.

16. In a type-writing machine, a mechanism for adjusting paper through either regular or irregular intervals at will, comprising, in combination, a cylindrical platen, means operating automatically to position the platen after free rotation thereof in either direction and including a wheel having a series of positioning teeth or notches arranged at line-space intervals, a set of minute teeth, a dog normally in engagement with said set of minute teeth and causing said platen and positioning-wheel to rotate together, a hand-wheel, and a device connected to said hand-wheel for disengaging said dog from said set of minute teeth, the whole being so arranged as that the hand-wheel may first render said dog inoperative and then effect a rotation of the platen independently of said positioning-wheel.

17. In a type-writing machine, a mechanism for adjusting paper through either regular or irregular intervals at will, comprising, in combination, a revoluble platen, means operating automatically to position the platen after free rotation thereof in either direction and including a wheel having a series of positioning teeth or notches arranged at line-space intervals, a set of minute teeth connected to or provided upon said wheel, a spring-pressed dog normally in engagement with said set of minute teeth, a plate mounted in a bearing which is provided in a head secured to one end of said platen, a cam or projection provided upon said plate, a shaft or spindle constructed to turn said plate to disengage said dog, and means for limiting the turning movement of said plate.

18. In a type-writing machine, the combination of a revoluble platen, a head or plate secured to one end thereof, a ratchet-wheel having a set of coarse teeth and a set of fine teeth and supported by said head or plate, a dog normally in engagement with the set of fine teeth, a platen-shaft, and means controlled thereby for disengaging said dog.

19. In a type-writing machine, the combination of a revoluble platen, a plate or head secured to one end thereof and having a tubular shank, a ratchet-wheel having a set of coarse teeth and a set of fine teeth and mounted on said head or plate, a dog normally in engagement with the set of fine teeth, a platen-shaft supported in said tubular shank, and an oscillator connected to said shaft for disengaging said dog.

20. In a type-writing machine, a mechanism for adjusting paper through either regular or irregular intervals at will, comprising, in combination, a revoluble platen having a shaft, means operating automatically to position the platen after free rotation thereof in either direction and including a wheel loosely mounted at one end of the platen and having a series of positioning teeth or notches arranged at line-space intervals, a set of minute teeth formed upon or rigidly connected to said wheel, a dog normally in engagement with said set of minute teeth, an oscillator constructed to be turned by said platen-shaft to disengage said dog, and a stop for limiting such turning movement after the disengagement of the dog.

21. In a type-writing machine, the combination of a revoluble platen, a plate or head secured to one end thereof and provided with a stop, a ratchet-wheel supported on said head and provided with a set of coarse teeth and a set of fine teeth, a dog connected to said head and normally in engagement with the set of fine teeth, an oscillator for disengaging said dog, and a platen shaft or spindle for actuating said oscillator.

22. In a type-writing machine, a mechanism for adjusting paper through either regular or irregular intervals at will, comprising, in combination, a revoluble platen, means operating automatically to position the platen after free rotation thereof in either direction and including a wheel having a series of positioning teeth or notches arranged at line-space intervals, a set of minute teeth connected to said positioning-wheel, a dog connected to the platen and normally engaging said set of minute teeth, and a dog-disengaging device connected to a handpiece.

23. In a type-writing machine, a mechanism for adjusting paper through either regular or irregular intervals at will, comprising, in combination, a revoluble platen, means operating automatically to position the platen after free rotation thereof in either direction and including a wheel having a series of positioning teeth or notches arranged at line-space intervals, a set of minute teeth formed upon said wheel, a dog mounted upon a support attached to said platen and normally engaging said set of minute teeth, and a handpiece connected to said dog so that on the first movement thereof the dog is disengaged and on a further movement thereof the platen is turned independently of said positioning-wheel.

24. In a type-writing machine, the combination of a revoluble platen, a line-space wheel connected thereto, devices for preventing the platen from rotating in one direction independently of the line-space wheel, and independent devices for preventing the platen from rotating in the opposite direction independently of the line-space wheel.

25. In a type-writing machine, the combination of a revoluble platen, a line-space wheel, devices for locking the platen against rotation in one direction relatively to the line-space wheel, independent devices for locking the platen against rotation in the opposite direction relatively to said line-space wheel, and means for releasing the platen from the control of said locking devices so that it may be turned in either direction independently of said line-space wheel.

26. In a type-writing machine, a mechanism for adjusting paper through either regular or irregular intervals at will, comprising, in combination, a revoluble platen, a wheel having a series of positioning teeth or notches arranged at line-space intervals, devices for locking said platen to said positioning-wheel, a hand-wheel connected to rotate said platen and positioning-wheel together freely in either direction, means coöperating with said notched wheel to position the platen after free rotation thereof in either direction by said hand-wheel, and a second hand-wheel having a rotatory movement only and connected to means for releasing the platen from the control of said locking devices, the latter being constructed and arranged to relock the platen to the line-space wheel after an adjustment of the platen through an irregular or minute interval has been effected by said second hand-wheel.

27. In a type-writing machine, a mechanism for feeding the paper step by step in line-space direction and also adjusting it in opposite directions through either regular or irregular intervals at will, comprising, in combination, a revoluble platen, a wheel having a series of positioning teeth or notches arranged at line-space intervals, independently-movable connecting devices between said platen and said positioning-wheel, line-spacing devices, means coöperating with said notched wheel to position the platen after free rotation thereof in either direction, and a hand-wheel movable relatively to the platen, said hand-wheel controlling said connecting devices, and the latter being constructed to automatically reconnect the platen to the line-space wheel after the platen has been adjusted through an irregular or minute interval in either direction by said hand-wheel.

28. In a type-writing machine, a mechanism for adjusting paper in opposite directions through either regular or irregular intervals at will, comprising, in combination, a revoluble platen, a wheel having a series of positioning teeth or notches arranged at line-space intervals, independently-movable connecting devices between said platen and said notched wheel, means coöperating with said notched wheel to position the platen after free rotation thereof in either direction, and a hand-wheel controlling said connecting devices and having a rotary movement only, the recited mechanism including means whereby upon a rotative movement of said hand-wheel in either direction said connecting devices may be moved and the platen may be adjusted through irregular or minute intervals.

29. In a type-writing machine, a mechanism for adjusting paper in opposite directions through either regular or irregular intervals at will, comprising, in combination, a cylindrical platen, a wheel adjustably connected thereto and provided with a series of positioning teeth or notches, means coöperating with said wheel to position the platen after free rotation thereof in either direction, a hand-wheel, means controlled by said hand-wheel for releasing the platen from the positioning-wheel, and means for enabling said hand-wheel to effect adjustments of the platen through irregular or minute intervals independently of said positioning-wheel, the construction and arrangement being such that upon release of said hand-wheel the platen is automatically reconnected in its adjusted position to said positioning-wheel.

30. In a type-writing machine, a mechanism for adjusting paper in opposite directions through either regular or irregular intervals at will, comprising, in combination, a revoluble platen, a wheel adjustably connected thereto and provided with a series of positioning teeth or notches, means coöperating with said wheel to position the platen after free rotation thereof in either direction, a shaft movable relatively to the platen and provided with means for releasing the platen from said positioning-wheel and for thereupon rotating the platen, a hand-wheel fixed upon said shaft, and a spring controlling said shaft, the recited mechanism including means whereby the hand-wheel and shaft may be moved to release the platen and also to effect minute rotative adjustments of the platen relatively to said positioning-wheel and whereby upon releasement of said hand-wheel said spring restores said hand-wheel and shaft to normal position and the adjusted platen is automatically reconnected to the said positioning-wheel.

31. In a type-writing machine, a mechanism for adjusting paper in opposite directions through either regular or irregular intervals at will, comprising, in combination, a revoluble platen, means operating automatically to position the platen after free rotation thereof in either direction and including a wheel having a series of positioning teeth or notches arranged at line-space intervals, two hand-wheels, means for enabling the platen to be rotated freely in either direction through one or more regular line-space intervals by manipulation of one of said hand-wheels, and means for enabling either of said hand-wheels to effect irregular or minute adjustments of the platen relatively to said positioning-wheel.

32. In a type-writing machine, the combination with a mechanism for adjusting paper in either direction through regular intervals, comprising both a revoluble platen and means operating automatically to position the platen after free rotation thereof in either direction and inclusive of a wheel having a series of positioning teeth or notches arranged at line-space intervals, of a mechanism for enabling the adjustment of any point or line upon the paper directly to the printing-line by a single movement of the paper and platen in either forward or backward direction, said last-mentioned mechanism including a scale or plate which extends longitudinally of the platen and which is movable from normal position to a position in which its edge registers with the printing-line upon the platen, and also including means independent of said platen-positioning means for holding the platen after rotative adjustment thereof through irregular or minute intervals, so that the desired type impressions may be made at said point or line upon the paper.

33. In a type-writing machine, the combination with a mechanism for adjusting paper in either direction through regular intervals, comprising both a revoluble platen and means operating automatically to position the platen after free rotation thereof in either direction and inclusive of a wheel having a series of positioning teeth or notches arranged at line-space intervals, of a mechanism for enabling the adjustment of any point or line upon the paper directly to the printing-line by a single movement of the paper and platen in either forward or backward direction, said last-mentioned mechanism including a scale or plate which extends longitudinally of the platen and which is movable from normal position to a position in which its edge registers with the printing-line upon the platen, and also including a hand-wheel for effecting irregular or minute adjustments of the platen independently of said platen-positioning means, and further including means for holding the platen in its adjusted position so that the desired type impressions may be made at said point or line upon the paper.

34. In a type-writing machine, the combination with a mechanism for adjusting paper in either direction through regular intervals, comprising both a revoluble platen and means operating automatically to position the platen after free rotation thereof in either direction and inclusive of a wheel having a series of positioning teeth or notches arranged at line-space intervals, of a mechanism for enabling the adjustment of any point or line upon the paper directly to the printing-line by a single movement of the paper and platen in either forward or backward direction, said last-mentioned mechanism including a scale or plate which extends longitudinally of the platen and which is movable from normal position to a position in which its edge registers with the printing-line upon the platen, and also including connecting devices arranged between said platen and said positioning-wheel, and further including a hand-wheel controlling said connecting devices so that upon rotation of said hand-wheel in either direction the platen may be rotated through irregular or minute arcs independently of said positioning-wheel, said connecting devices being constructed to maintain the platen in its adjusted position relatively to said positioning-wheel, so that the desired type impressions may be made at said point or line upon the paper.

35. In a type-writing machine, the combination with a cylindrical platen, of a line-space wheel, means for holding the platen at regular intervals in its rotation corresponding to the notches in said line-space wheel, means for holding the platen at intermediate points, a platen-scale arranged normally away from the printing-line upon the platen, and means for moving said platen-scale to said printing-line, whereby any line or point upon the paper may be brought into register with said printing-line by a single rotatory adjustment of the platen.

36. In a type-writing machine, the combination with a platen and a line-feed ratchet-wheel, of means for moving said platen through irregular or minute arcs relatively to said line-feed ratchet-wheel and for holding it in its adjusted position, a platen-scale arranged normally away from the printing-line upon the platen, and means for moving said platen-scale to said printing-line, whereby any line or point upon the paper may be brought into register with the printing-line by a single rotatory adjustment of the platen.

37. In a type-writing machine, the combination with a platen of a line-space ratchet-wheel, devices connecting the platen to the line-space wheel so that the two rotate together, means for releasing the platen from the control of said connecting devices so that the platen may be rotated through irregular or minute arcs independently of the line-space ratchet-wheel, said connecting devices being constructed to maintain the platen in its adjusted position relatively to the line-space ratchet-wheel, a platen-scale normally arranged away from the printing-line upon the platen, and means for moving said platen-scale to said printing-line, whereby upon releasement of the platen from the line-space wheel any line or point upon the paper may be brought into register with the printing-line by a single rotatory adjustment of the platen, and whereby the paper may be held in such position so that the desired type impressions may be made at said line or point upon the paper.

38. In a type-writing machine, the combination with a platen adapted to be turned from a working to a non-working position, of a platen-scale which moves automatically to the printing-point when the platen is turned to a non-working position, and means for rotatively adjusting the platen through minute arcs and holding it in such adjusted position while the type impressions are being made.

39. In a type-writing machine, the combination with a carriage of an independently-movable frame thereon, a platen mounted in said frame and adapted to be turned from a working to a non-working position, a scale traveling longitudinally with said carriage and constructed to move automatically to the printing-point when the platen is turned to a non-working position, and means for rotatively adjusting the platen through minute arcs and holding it in such adjusted position while the type impressions are being made.

40. In a type-writing machine, the combination with a carriage of a platen adapted to be turned from a working to a non-working position, a scale traveling therewith and moving automatically to the printing-line when the platen is turned to a non-working position, suitable line-spacing devices, a hand-wheel, and mechanism connecting said platen and said hand-wheel and so constructed and arranged that said platen may be rotatively adjusted by said hand-wheel through minute arcs, whereby upon moving said platen to a non-working position any line or point upon the paper may be brought into register with the printing-line by a single rotative adjustment of the platen.

41. In a type-writing machine, the combination with a platen of a carriage and a platen-scale connected to the carriage and moving longitudinally therewith, said scale being supported normally away from the printing-line upon the platen, and means connected to said carriage for supporting said scale in register with said printing-line.

42. In a type-writing machine, the combination with a platen and a carriage, of a platen-scale arranged upon the carriage and normally supported away from the printing-line upon the platen, and manually-actuated mechanism arranged upon said carriage for moving said scale into register with said printing-line.

43. In a type-writing machine, the combination with a platen and a carriage, of a platen-scale supported upon the carriage, and a manually-actuated lever connected to the carriage and constructed to move said platen-scale from normal position to a position in register with the printing-line upon the platen.

44. In a type-writing machine, the combination with a platen and a carriage, of a platen-scale, arms thereon, said arms being pivoted to the carriage, and a manually-actuated lever connected to the carriage for swinging the scale upon said arms from normal position to a position in register with the printing-line upon the platen.

45. In a type-writing machine, the combination with a platen and a longitudinally-traveling platen-frame so constructed and arranged as to expose in front of the platen the line which is being written, of a scale so mounted in proximity to the platen that it may be moved upwardly in front of the platen into register with said exposed line of writing and downwardly away from said exposed line.

46. In a type-writing machine, the combination with a longitudinally-traveling platen upon the front of which the line of writing is or may be exhibited, of a scale arranged in proximity to the platen, a lever, and connections whereby said lever may move the scale upwardly in front of the platen into register with the line of writing thereon.

47. In a type-writing machine, the combination with a platen and a longitudinally-traveling platen-frame so constructed and arranged as to exhibit the line of writing in front of the platen, of a scale arranged in proximity to the platen, and cam mechanism for moving said scale upwardly in front of said platen into register with the printing-line thereon.

48. In a type-writing machine, the combination of a carriage, scale 19 thereon, a platen, scale 13 independently connected to the carriage, and means for moving scale 13 into register with the printing-line.

49. In a type-writing machine, the combination with a carriage, a platen-frame movable independently of said carriage, and a platen, of a platen-scale normally supported away from the printing-line and movable independently of both the carriage and the platen-frame and connected at one point with the platen-frame and at another point with the carriage, the construction and arrangement being such that by a movement of said platen-frame said scale may be brought into register with the printing-line upon the platen.

50. In a type-writing machine, the combination of a carriage, a platen-frame movable independently of said carriage, a platen, a platen-scale pivoted or hinged upon the carriage and normally supported away from the printing-line, and also movable independently of both the carriage and the platen-frame, and a connection between said scale and said platen-frame for causing said scale to be moved by said platen-frame to a position in register with the printing-line upon the platen.

51. In a type-writing machine, the combination of a carriage, a platen-frame movable independently of said carriage, a platen-scale pivoted or hinged to one of said devices and normally supported away from the printing-line, and means called into action by a movement of said platen-frame for causing said scale to move into register with the printing-line upon the platen.

Signed at Springfield, in the county of Hampden and State of Massachusetts, this 18th day of October, A. D. 1897.

HENRY W. MERRITT.

Witnesses:
J. G. DUNNING,
CHAS. J. BOND.